(12) United States Patent  
Marcucci et al.

(10) Patent No.: US 11,906,133 B2  
(45) Date of Patent: Feb. 20, 2024

(54) OUTDOOR LIGHTING APPARATUS

(71) Applicant: Alliance Sports Group, L.P., Roanoke, TX (US)

(72) Inventors: Todd Lee Marcucci, Mansfield, TX (US); Clark McCune, Roanoke, TX (US); Jimmy Prieto, Trophy Club, TX (US)

(73) Assignee: Alliance Sports Group, L.P., Roanoke, TX (US)

( * ) Notice: Subject to any disclaimer, the term of this patent is extended or adjusted under 35 U.S.C. 154(b) by 0 days.

(21) Appl. No.: 18/128,428

(22) Filed: Mar. 30, 2023

(65) Prior Publication Data

US 2023/0358377 A1 Nov. 9, 2023

Related U.S. Application Data

(60) Provisional application No. 63/325,833, filed on Mar. 31, 2022.

(51) Int. Cl.
*F21S 8/08* (2006.01)
*F21V 21/08* (2006.01)
(Continued)

(52) U.S. Cl.
CPC .............. *F21S 8/081* (2013.01); *F21S 9/035* (2013.01); *F21V 21/0824* (2013.01);
(Continued)

(58) Field of Classification Search
CPC .. F21S 8/081; F21S 8/083; F21S 8/085; F21S 9/035; F21S 9/032; F21S 6/005;
(Continued)

(56) References Cited

U.S. PATENT DOCUMENTS 6,357,893 B1  3/2002  Belliveau
7,207,693 B2  4/2007  Ratcliffe
(Continued)

FOREIGN PATENT DOCUMENTS

CN  103649634 A  3/2014
CN  104048195 A  9/2014
(Continued)

OTHER PUBLICATIONS

Machine translation of Goehring et al., EP 1500870A1, published Jan. 26, 2005 (Year: 2005).*

(Continued)

*Primary Examiner* — William N Harris
(74) *Attorney, Agent, or Firm* — Thorpe North & Western, LLP; Jed H. Hansen

(57) ABSTRACT

An outdoor lighting device is disclosed having a vertical stand and a curved rigid housing disposed about a top of the stand coupled to a power source, wherein the curved housing has a curved planar surface having a radius of curvature. The curved housing has an outside side and an inner side, the inner side having a curved COB LED assembly with a radius of curvature that is substantially the same as the radius of curvature of the housing. A gear is coupled to the stand and the curved housing and is configured to permit the curved housing to be rotated 360 degrees radially with respect to the stand and 90 degrees vertically with respect to the stand.

16 Claims, 6 Drawing Sheets

(51) Int. Cl.
  *F21V 21/30* (2006.01)
  *F21S 9/03* (2006.01)
  *F21W 131/10* (2006.01)
  *F21Y 115/10* (2016.01)

(52) U.S. Cl.
  CPC ......... *F21V 21/30* (2013.01); *F21W 2131/10* (2013.01); *F21Y 2115/10* (2016.08)

(58) Field of Classification Search
  CPC ...... F21V 21/0824; F21V 21/30; F21V 21/26; F21V 21/28; F21V 21/29
  See application file for complete search history.

(56) References Cited

U.S. PATENT DOCUMENTS

| | | | |
|---|---|---|---|
| 7,557,367 B2 | 7/2009 | Rogers et al. | |
| 8,722,458 B2 | 5/2014 | Rogers et al. | |
| 8,922,511 B1 | 12/2014 | Salmon | |
| 9,874,326 B1* | 1/2018 | Dai | F21V 7/04 |
| 11,204,143 B1* | 12/2021 | Hollinger | F21V 23/0464 |
| 11,598,503 B1* | 3/2023 | Hwang | F21S 8/036 |
| 2004/0150714 A1 | 8/2004 | Lin | |
| 2005/0103378 A1* | 5/2005 | Pu | F21V 21/0824 |
| | | | 136/291 |
| 2006/0187656 A1* | 8/2006 | Kuelbs | F21S 9/035 |
| | | | 362/183 |
| 2007/0002561 A1* | 1/2007 | Tesmer | F24S 30/48 |
| | | | 362/276 |
| 2007/0295973 A1 | 12/2007 | Jinbo et al. | |
| 2008/0253145 A1 | 10/2008 | Biarne et al. | |
| 2010/0171138 A1 | 7/2010 | Yamazaki et al. | |
| 2012/0175667 A1 | 7/2012 | Golle et al. | |
| 2012/0295376 A1 | 11/2012 | Lee et al. | |
| 2013/0010460 A1 | 1/2013 | Peil et al. | |
| 2013/0077298 A1 | 3/2013 | Steele et al. | |
| 2013/0221846 A1 | 8/2013 | Alexiou et al. | |
| 2013/0223071 A1 | 8/2013 | Nishimori et al. | |
| 2013/0286645 A1 | 10/2013 | Bukkems et al. | |
| 2014/0036205 A1 | 2/2014 | Sugiura | |
| 2014/0078582 A1 | 3/2014 | Cho | |
| 2014/0092630 A1 | 4/2014 | Franklin et al. | |
| 2014/0098529 A1 | 4/2014 | Hata et al. | |
| 2014/0111953 A1 | 4/2014 | McClure et al. | |
| 2014/0140082 A1 | 5/2014 | Kuboyama et al. | |
| 2014/0226330 A1 | 8/2014 | Yun | |
| 2014/0239276 A1 | 8/2014 | Lin et al. | |
| 2014/0240985 A1 | 8/2014 | Kim et al. | |
| 2014/0254152 A1 | 9/2014 | Bohler | |
| 2014/0264299 A1 | 9/2014 | Naijo | |
| 2014/0264407 A1 | 9/2014 | Tischler et al. | |
| 2014/0268739 A1 | 9/2014 | Veres et al. | |
| 2014/0369038 A1 | 12/2014 | Tischler et al. | |
| 2015/0109778 A1 | 4/2015 | Yokotani et al. | |
| 2015/0276198 A1 | 10/2015 | Hata et al. | |
| 2016/0147055 A1 | 5/2016 | Moriuchi et al. | |
| 2016/0351619 A1 | 12/2016 | Cramer | |
| 2017/0368983 A1* | 12/2017 | Salter | B60Q 1/085 |
| 2019/0319660 A1 | 10/2019 | Cramer | |
| 2020/0263856 A1* | 8/2020 | Ko | F21V 15/02 |
| 2021/0352795 A1* | 11/2021 | Lu | F21V 23/0471 |

FOREIGN PATENT DOCUMENTS

| | | | |
|---|---|---|---|
| CN | 107534051 A | 1/2018 | |
| DE | 20 2010 005 863 | 8/2010 | |
| EP | 1500870 A1 * | 1/2005 | ............. F21S 8/081 |
| JP | 2001283612 A | 10/2001 | |
| WO | WO 2010/132552 | 11/2010 | |
| WO | WO 2011/126726 | 10/2011 | |
| WO | WO 2014/035014 | 3/2014 | |
| WO | WO 2016/172719 | 10/2016 | |

OTHER PUBLICATIONS

Rak Hwan Kim, Printed Microscale Inorganic Light Emitting Diodes on Flexible Substrates for Display, Biomedical, and Robotic Application, Dissertation Submitted in partial fulfillment of the requirements for the degree of Doctor of Philosophy in Materials Science and Engineering in the Graduate College of the University of Illinois at Urbana-Champaign, Sep. 18, 2012, 164 pages.

PCT Application No. PCT/US16/29240 Filing Date Apr. 25, 2016, Steven Cramer, International Search Report dated Oct. 13, 2016; 4 pages.

Kan Zhang[3,1], Jung-Hun Seo[1], Weidong Zhou[2] and Zhenqiang Ma[4,1] Published Mar. 23, 2012 • © 2012 IOP Publishing Ltd *Journal of Physics D: Applied Physics*, vol. 45, No. 14Citation Kan Zhang et al 2012 *J. Phys. D: Appl. Phys.* 45 143001DOI 10.1088/0022-3727/45/14/143001.

* cited by examiner

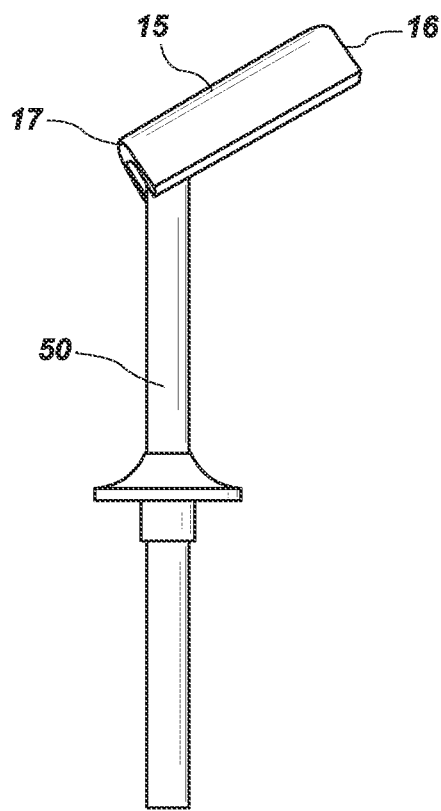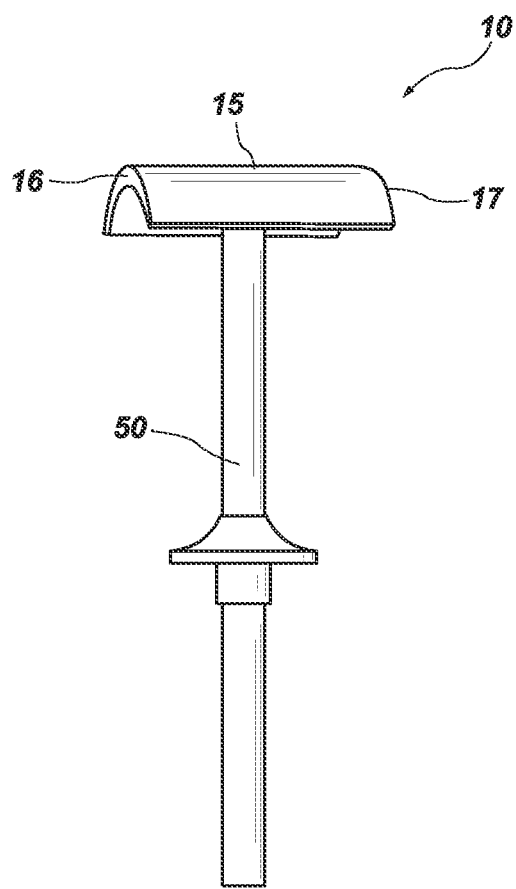
FIG. 1
FIG. 2

OUTDOOR LIGHTING APPARATUS

PRIORITY CLAIM

The present application claims priority to U.S. Ser. No. 63/325,833 filed on Mar. 31, 2022 entitled "Outdoor Lighting Apparatus" which is incorporated herein by reference in its entirety.

FIELD OF THE TECHNOLOGY

The present technology relates generally to the field of light emitting diode technology and more particularly to curved chip-on board LED technology for outdoor use.

BACKGROUND

Outdoor lighting is an increasingly useful application and portable outdoor lighting that is easy to use and manipulate is in demand. Current applications for outdoor lighting can be cumbersome and difficult to adapt to user specific needs and situations. Aspects of the current technology provide increased operational benefits and utility to the user.

BRIEF DESCRIPTION OF THE DRAWINGS

Features and advantages of the technology will be apparent from the detailed description which follows, taken in conjunction with the accompanying drawings, which together illustrate, by way of example, features of the technology; and, wherein:

FIG. 1 is a side view of lighting devices in accordance with one aspect of the technology;

FIG. 2 is a side view of a lighting device in accordance with one aspect of the technology;

DETAILED DESCRIPTION

Figures 3, 4:
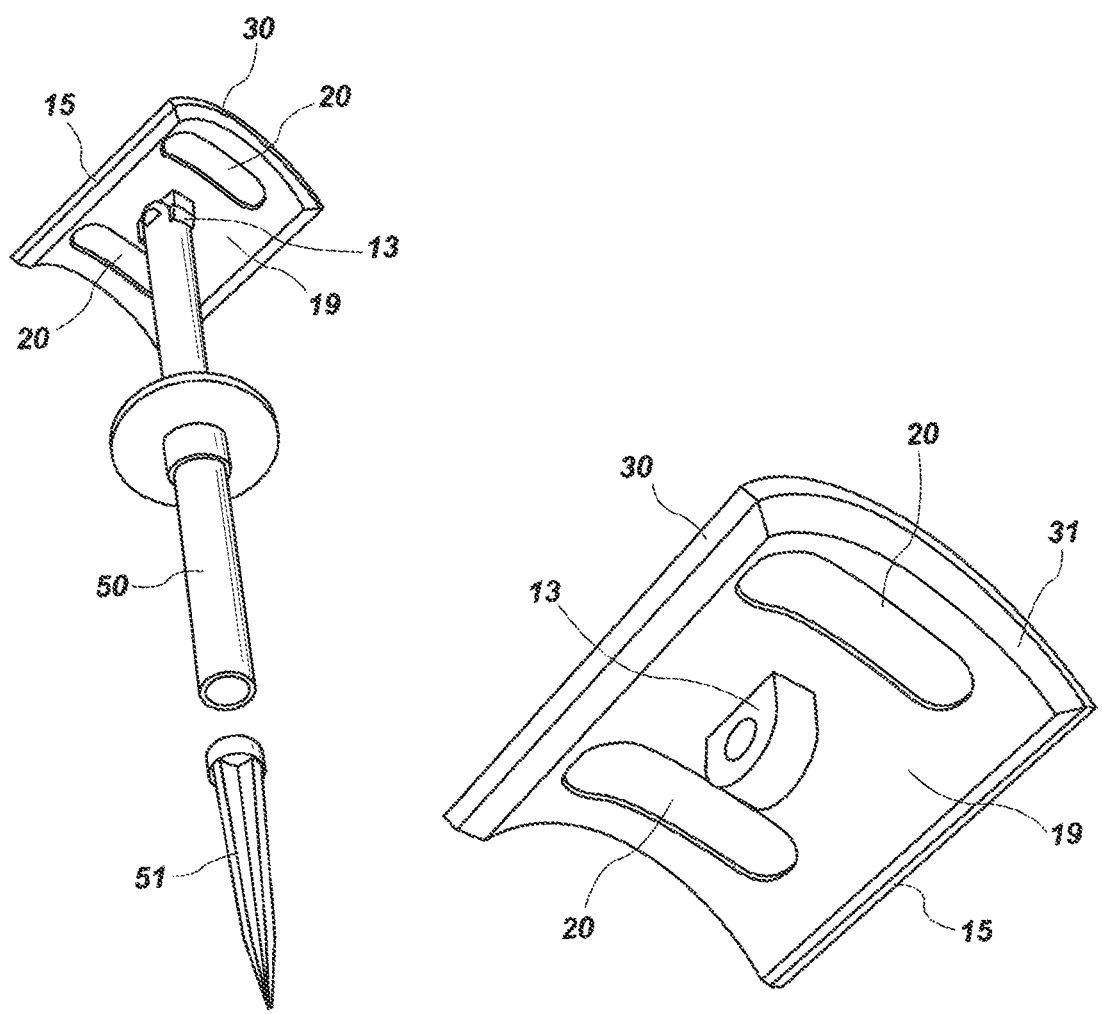
FIG. 3 is a bottom perspective view of a lighting device in accordance with one aspect of the technology.
FIG. 4 is a bottom perspective view of a lighting device in accordance with one aspect of the technology.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

An initial overview of the technology is provided below and specific technology embodiments are then described in further detail. This initial summary is intended to aid readers in understanding the technology more quickly, but is not intended to identify key or essential features of the technology, nor is it intended to limit the scope of the claimed subject matter.

Broadly speaking, aspects of the current technology improve outdoor lighting options and operations. Aspects of the technology eliminate circuitry and components and improve overall lighting abilities and focusing operations. Aspects of the technology comprise curved outdoor lighting housings with curved COB LEDs disposed thereon. Different curved surfaces with different curved COB LEDs provide adjustable lights about different radial areas surrounding a fixture. Vertical portions of different radial areas likewise accommodate curved COB LEDs.

While the term LED is used herein in connection with a light source, it is understood that a single LED may be used as a first light source or a plurality of LEDs with similar capabilities may be used. Similar LEDs may be disposed on a similar chip or substrate or they may be disposed on different chips and different substrates and disposed about different locations of the housing as suits a particular design. Meaning, LEDs with similar characteristics may be located about numerous different locations of the device. Moreover, other light sources may be used besides LEDs.

In one aspect of the technology, the light sources or LEDs are configured with pulse-width modulation ("PWM") to "dim" specific LED lights. PWM is one way of regulating the brightness of a light. Thus, in one area a user may select a first PWM mode and in a different area a user may select a second PWM mode such that different LED lights on the same set of outdoor lights have different levels of "dimness." In one aspect, light emission from the LED is controlled by pulses wherein the width of these pulses is modulated to control the amount of light perceived by the end user. When the full direct current voltage runs through an LED, the maximum of light is emitted 100% of the time. That is, the LED emits light 100% of the time when in an "on" mode. With PWM, the voltage supplied to the LED can be "on" 50% of the time and "off" 50% of the time so that the LED gives off its maximum amount of light only 50% of the time. This is referred to as a 50% duty cycle. In this scenario, if the on-off cycle is modulated fast enough, human eyes will perceive only half the amount of light coming from the LED. That is, with such an input on the LED, the amount of light given off appears diminished by 50%. While specific reference is made to a 50% duty cycle, the LED duty cycle of the light sources described herein (UV and/or white LED, etc.) may be greater or lesser than 50% as suits a particular purpose. For example, a first area of LED(s) and/or other LEDs propagating light at different wavelengths in other areas may have a duty cycle that ranges from 25% to 40%, 40% to 50%, 50% to 60%, and/or 60% to 75%. They may also have duty cycles that range from 20% to 25%, 25% to 30%, 30% to 35%, 35% to 40%, 40% to 45%, 45% to 50%, 50% to 55%, 55% to 60%, 60% to 65%, 65% to 70%, 70% to 75%, 75% to 80%, 80% to 85%, 85% to 90%, 90% to 95%, and/or 95% to 100%. The range may of course include more than the ranges provided herein and may include a greater range or a smaller range.

In one aspect of the technology, the on-off cycle (i.e., the rate at which the LEDs are turned on and off) is greater than about 80 KHz to about 100 KHz. In another aspect, the on-off cycle is greater than about 100 KHz to about 120 KHz. In another aspect of the technology, the on-off cycle ranges from about 10 KHz to about 200 KHz. In another aspect, the on-off cycle ranges from about 1 KHz to about 20 KHz. Advantageously, the device can be operating in a "dimmed" mode in some areas while still providing "non-dimmed" LED light in specific other areas. That is, the duty cycle of the one area of LEDs may be 100% while the duty cycle of the LEDs in other areas is less than about 100% or vice versa. In addition, both lights may be operated at about 100% of the duty cycle or both may be operated at less than about 100% of the duty cycle. Reference may be made herein to LED lights that are not pulse width modulated. Most LED lights will not be operated in a static mode, meaning they will not truly be without any pulse width modulation. For purposes of this application, an LED light is effectively static or effectively without pulse width modulation if it is modulated at a frequency less than about 2 KHz.

In one aspect of the technology, the second light source or second LED (or LED assembly) is configured to propagate light at a static power level. The first light source is configured to operate having a randomized duty cycle or a preset plurality of duty cycles. Meaning, the first light source operates at a first duty cycle (e.g., 25%) for a first period of time (e.g., 5 s, 10 s, or 15 s) and then operates at a second duty cycle (e.g., 50% or more) for a second period of time (e.g., 5 s, 10 s, or 15 s). In addition, the first and second LEDs may be operated at different duty cycles in order to increase a desired effect by the user. For example, the duty cycle for the first LED could be increased while the duty cycle of the second LED is decreased. In another aspect, the duty cycle of each is substantially the same, but the number of LEDs disposed about the device is different creating a different effect for the end user and/or changing the overall power consumption of the device. That is, a first light source (e.g., the source less visible to the human eye) comprises a plurality of LEDs that are greater than the plurality of LEDs of the second light source or vice versa. The duty cycles for each light source may be the same, but the relative power consumption is different because the total number of LEDs in the light source is different.

In another aspect of the technology, the lighting devices comprise LEDs wherein a frequency of light is propagated from the LEDs for a first period of time (e.g., 5 s, 10 s, or 15 s), a second frequency of light is propagated from the LEDs for a second period of time, and a third frequency of light is propagated from the LEDs for a third period of time. The first, second, and third periods of time may be the same, or they may be different as suits a particular purpose. In an additional aspect, the different frequencies are propagated from different LEDs and not necessarily from the same LED or the same group of LEDs. For example, in one aspect, light is propagated from the lighting device from one or more LEDs at 420 nm for 5 seconds, at 600 nm for 5 seconds, and then 700 nm for 5 seconds. The light may be propagated at a static power level or a variable duty cycle.

With reference to FIGS. 1-6, in one aspect of the technology, an outdoor lighting device 10 is disclosed. The lighting device 10 comprises a rigid outer housing 15 shaped to approximate a portion of a cylinder. In one aspect, the housing 15 has a fixed radius of curvature extending from a first end 16 of the housing 15 to a second end 17 of the housing. In one aspect, the shape of the housing 15 is a half-circle (i.e., extending 180 degrees) or less than a half-circle (i.e., extending less than 180 degrees). In one aspect of the technology where the housing 15 is less than 180 degrees, it comprises an arc ranging from between 90 and 180 degrees, 90 and 120 degrees, or is at a minimum 90 degrees.

The housing 15 is coupled to a vertical stand 50 by way of a gear or hinge 13 that allows for the housing 15 to be adjusted radially 360 degrees with respect to the vertical stand 50. The gear 13 also allows the housing 15 to be adjusted 90 degrees vertically with respect to the vertical stand 50. In one aspect, the stand comprises a bottom stake 51 for placement beneath the ground. The housing 15 is coupled to a power source. In one aspect, the power source comprises a solar panel, battery, or other electrical connection. In one aspect of the technology, shown in FIGS. 1 and 5, the gear 13 is coupled with the housing at a second end 17 of the housing 15. In another aspect of the technology, as shown in FIGS. 2-4, the housing 15 is coupled to the gear 13 about a middle or center part of the housing 15.

Referring generally to FIGS. 1-6, in one aspect of the technology, the housing 15 comprises a plurality of LED light sources. A first light source 20 is disposed about an interior radial circumference 19 of the housing 15. The first light source 20 comprises one or more curved COBs having a radius of curvature that is substantially similar to the radius of curvature of the housing 15. In this manner, light propagated from the first light source(s) is directed in the area defined by the curve of the housing 15 as shown along line A. In one aspect of the technology shown on FIG. 2-4, for example, the light sources are disposed about opposing sides of the interior of the housing 15. In this aspect, the light sources are disposed on opposing sides of where the gear 13 couples with the housing 15. However, in other aspects, the light source 20 can be a single COB with a void in the center allowing for coupling of the gear 13 to housing 15 without interfering with the function of the COB. In the aspect of the technology shown on FIGS. 1 and 5, for example, the light source 20 comprises a curved COB and may be one or more curved COB s as suits a particular purpose. For example, in one aspect, a single COB is used for the light source 20 with different LEDs disposed thereon. Logic associated with the PLC is used to operate sections of the LEDs within the single COB. In another aspect, two COBs are used with different light sources disposed about the different COBs. In this manner, the manufacturing process is simplified if one wants to regulate the different LEDs differently.

In one aspect of the technology, the curved COB comprises a flexible substrate during a first portion of the manufacturing process. However, once the curved COB is placed on the housing 15, it loses flexibility such that it cannot be substantially deformed without suffering plastic deformation and ultimate failure. In one aspect, the first light source 20 is coupled to a programmable logic controller (PLC) that regulates the light intensity and/or frequency of light propagated from the LEDs on the one or more curved COB s.

Figure 6:
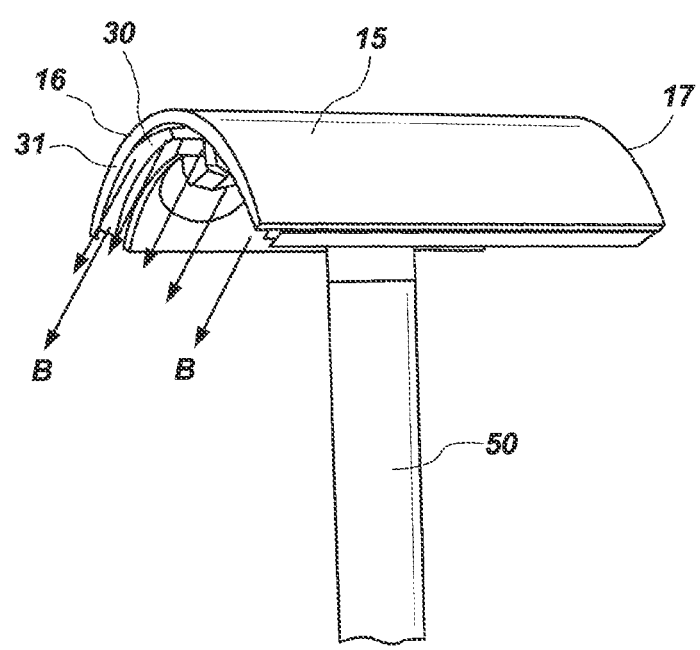
FIG. 6 is a perspective view of a lighting device in accordance with one aspect of the technology.
Figure 5:
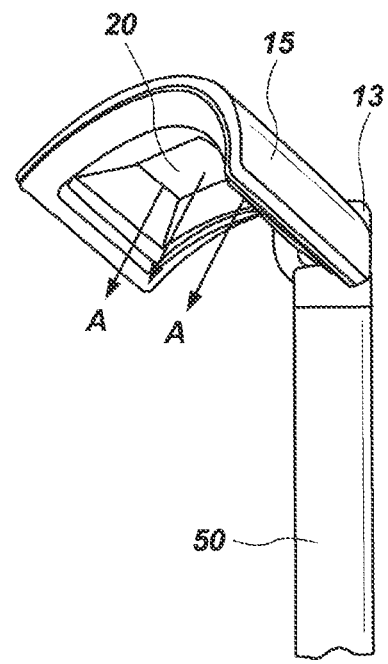
FIG. 5 is a perspective view of a lighting device in accordance with one aspect of the technology.

Referring now generally to FIGS. 1-8, but more specifically to FIG. 6, a second light source 30 is disposed about a first edge 16 and/or second edge 17 of the housing 15. The one or more COBs of the second light source 30 comprises an arc that also has a radius of curvature similar to the radius of curvature or arc of the housing 15. In one aspect of the technology, the second light source 30 has a face 31 that is substantially perpendicular to the housing 15. In this manner, light propagated from the second light source 30 is directed in a path that is substantially parallel with a longitudinal axis of the housing 15. In another aspect, however, the face 31 of the second light source 30 is oriented at an angle less than 90 degrees with respect to a longitudinal axis of the housing 15. In this manner, light propagated from the second light source 30 is direct both in the direction of the longitudinal axis of the housing 15 and downward from the direction of the longitudinal axis of the housing 15 as shown along line B. In one aspect of the technology, the second light source 30 is coupled to the same PLC as the first light source 20. While an example of the second light source 30 is shown in connection with the aspect of a housing 15 coupled with the gear 13 at the middle or center of the housing, it is understood that the second light source 30 may also be used in connection with other aspects of the technology disclosed herein (see FIG. 1, 5, 7 or 8, for example).

Figure 7:
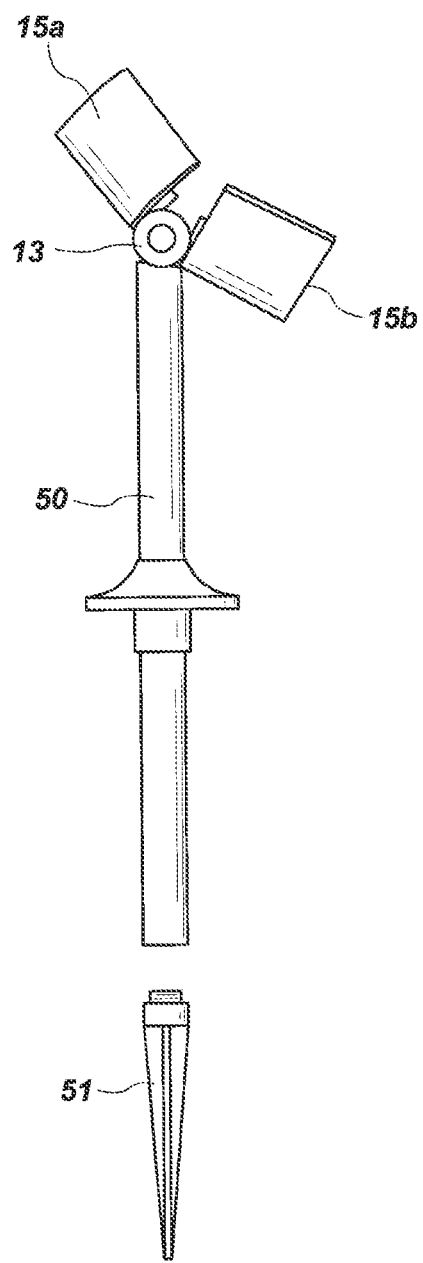
FIG. 7 is a perspective view of a lighting device in accordance with one aspect of the technology.
Figure 8:
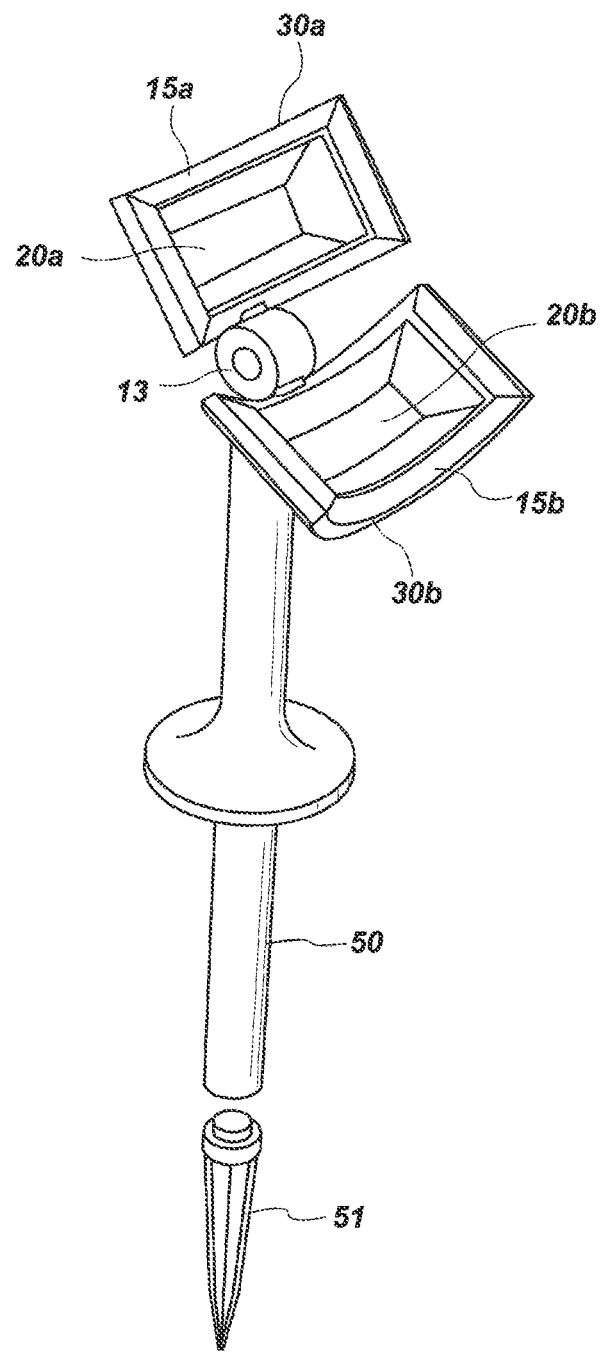
FIG. 8 is a perspective view of lighting devices in accordance with one aspect of the technology.

Referring now to FIGS. 7 and 8, in one aspect of the technology, the lighting device 10 comprises two housing components 15a, 15b coupled together with a hinge 13 so that the two housings 15a, 15b may be opened or oriented at different angles. In this aspect of the technology, the first light source 20a, 20b comprises two separate curved COB assemblies. A first assembly 20a is located on one side of the hinge 13 disposed about housing 15a and a second assembly 20b is located adjacent the first assembly on the other side of the hinge 13 about housing 15b. In this manner, when the housing 15a, 15b is in a closed position, the first assembly 20a and second assembly 20b are next to one another and propagate light in substantially the same direction. When the housing 15 is in a second (or open) position, the first assembly 20a and second assembly 20b are oriented at different angles with respect to one another and propagate light in different directions. In one aspect, the housing 15a is hinged in a manner so the break in the housing 15a is perpendicular to a longitudinal axis of the housing 15a. In another aspect, the break in the housing 15a is parallel to a longitudinal axis of the housing 15a. In another aspect of the technology, the separate pieces of housing 15a and 15b are separated by a hinge 13 and are independently moveable with respect to one another. Each piece 15a and 15b, comprises its own separate curved COB LED assembly 20a and 20b, respectively. Independent movement of each piece 15a, 15b of the housing allows the user to position the difference curved lighting surfaces as suits a desired application.

In one aspect of the technology, additional or second curved lighting components 30a and 30b are disposed about the outside edges of the pieces 15a, 15b. Lighting components In one aspect, 30a and 30b are perpendicular to a longitudinal axis of the housing pieces 15a, 15b respectively, so that they propagate light in a direction that is substantially parallel with a longitudinal direction of the housing 15a, 15b, respectively. In another aspect, the lighting components 30a, 30b are cantered so that they are oriented to propagate light at an angle that is not substantially parallel with a longitudinal direction of the housing 15a, 15b, respectively. In one aspect, the additional or second lighting components 30a, 30b are placed on one or more sides of the housing 15a, 15b as desired.

Figure 9:
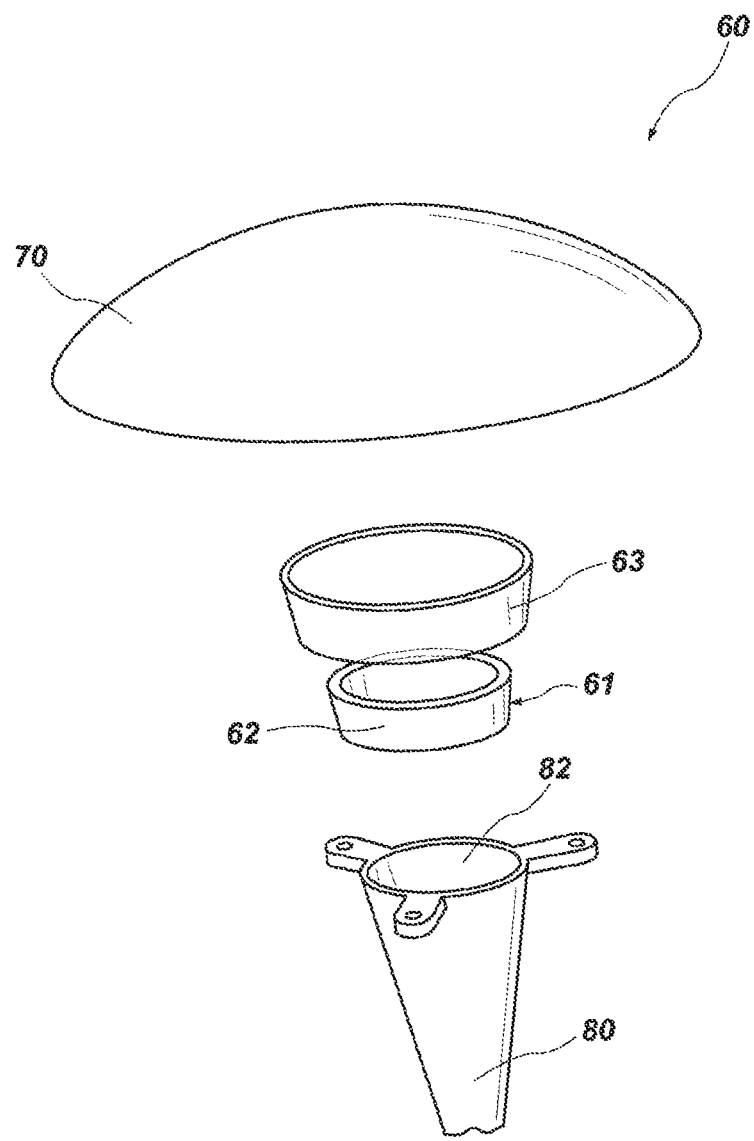
FIG. 9 is an exploded view of a lighting device in accordance with one aspect of the technology.
Figure 10:
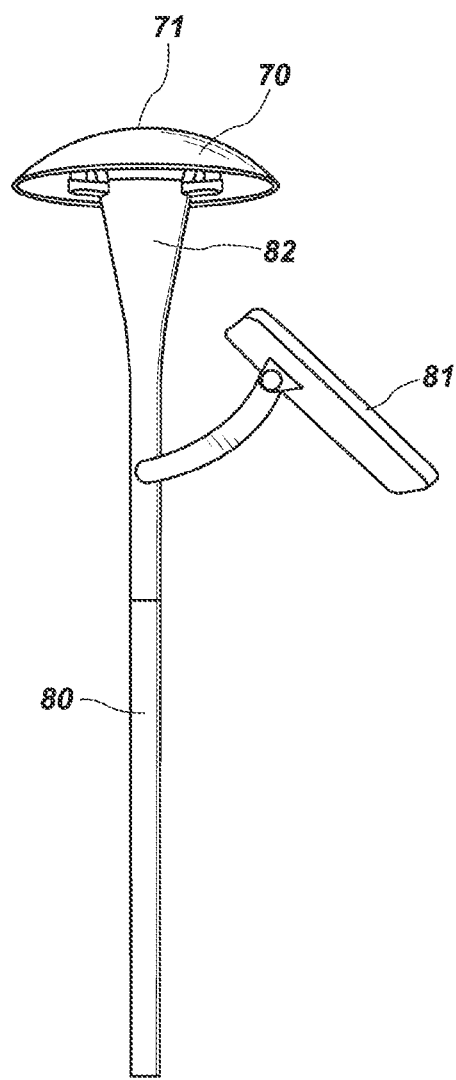
FIG. 10 is a perspective view of a lighting device in accordance with one aspect of the technology.
Figure 11:
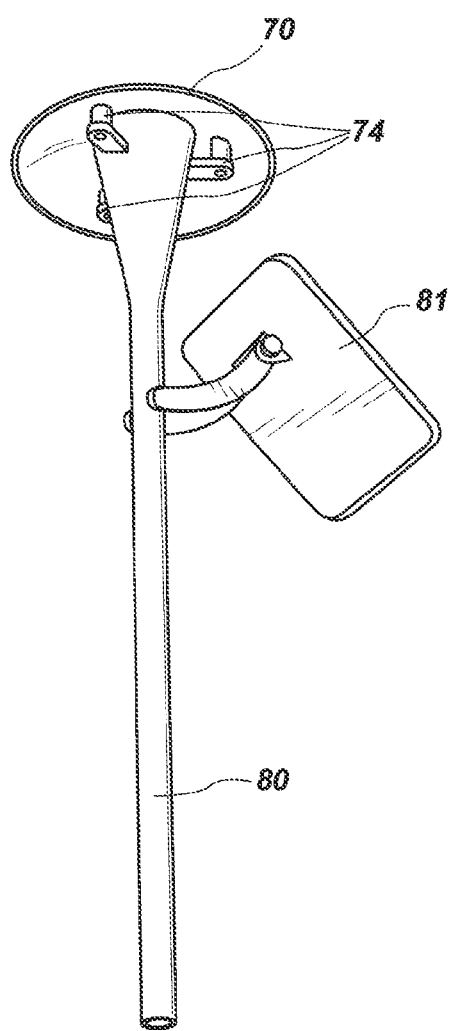
FIG. 11 is a perspective view of a lighting device in accordance with one aspect of the technology.

Referring generally to FIG. 9-11, in another aspect of the technology, a lighting device 60 is disclosed comprising an annular substrate with a curved COB LED assembly 61 disposed thereon. The annular COB assembly 61 is disposed atop a vertical or linear stand 80 coupled to a solar panel 81 or other power source. The top of the linear stand 80 comprises a mouth or opening configured to receive a bottom portion of the curved COB assembly 61 therein, the mouth or opening 82 having a diameter that is greater than a diameter of the stand 80. In one aspect of the technology, the annular curved COB LED assembly 61 comprises a face 62 that is parallel to a longitudinal axis of the linear stand 80. In another aspect, the face 62 is angled or canted with respect longitudinal axis of the linear stand 80 such that light is propagated either upward or downward (depending on the angle) with respect to the longitudinal axis of the linear stand 80. It is anticipated that in most uses, the annular COB assembly 61 will have a top circumference that is greater than a bottom circumference creating an angle of the face 62 that is less than 90 degrees with respect to the longitudinal axis of the linear stand 80. In one aspect, the annular COB assembly 61 is covered by a lens 63. The shape of the lens 63 is configured to approximate the shape of the COB assembly 61. Meaning, if the annular COB assembly comprises a face 62 that is substantially parallel with the longitudinal axis of the linear stand 80, the face of the lens 63 will have a similar geometry. Likewise, if the face 62 of the annular COB assembly 61 is sloped downward or at an angle with respect to the longitudinal axis of the linear stand, the face of the lens will also slope downward. In another aspect, an upper cover 70 is disposed about the annular COB assembly 61. The upper cover comprises a domed structure configured to direct light from the annular COB assembly 61 in a downward direction. In one aspect, the domed structure comprises a solar panel 71 centered about the top of the dome. The dome or upper cover 70 is coupled to the mouth or opening of the stand 82 at a plurality of connection points 74.

In any of the aspects disclosed herein, the curved COB LEDs (annular assembly or otherwise) can have multiple radial sections. In one aspect, for example, a first section of a curved COB representing a 60-degree arc may be configured to activate in a first mode and a remaining 60-degree portion of an arc (totaling 120 degrees) may be activated in a second mode. With respect to the annular COB, a first section of the curved COB representing a 60-degree arc may be configured to activate in a first mode and the remaining 300-degree arc (for a total of 360 degrees) may be activated in a second mode. This allows for lighting different radial areas surrounding the fixture. In addition to radial segments, different vertical portions of a curved COB may be activated in different modes. While different 60-degree arcs are noted above, it is understood that many different sized arcs may be used as suits a particular application. For example, in one aspect the annular COB may be activated with only a 15-degree arc, a 30-degree arc, or 45-degree arc.

In one aspect of the technology, a plurality of devices 10 are employed near one another at the same structure. For example, a plurality of devices 10 are located about the driveway of a home or about the base of a home. In one aspect of the technology, each of the devices are linked together with a wireless connection located on the device 10 itself. Each device 10 comprises a wireless receiver and a wireless transmitter to communicate to server or other remote location. Each of the devices 10 may be operated separately, all together, or in subgroups as suits a desired outcome of the user. The devices 10 can be operated and/or pre-programmed through an application programming interface (API) accessible via a smartphone, desktop, laptop or other computing device. In this manner, different devices 10 may be programmed to have a particular duty cycle (or other operational parameter) than other devices 10 depending on their location about the home. The wavelength of light may also be adjusted differently for each device 10 as suits a desired outcome of the user.

It is noted that no specific order is required in these methods unless required by the claims set forth herein, though generally in some embodiments, the method steps can be carried out sequentially.

The foregoing detailed description describes the technology with reference to specific exemplary aspects. However, it will be appreciated that various modifications and changes can be made without departing from the scope of the present technology as set forth in the appended claims. The detailed description and accompanying drawing are to be regarded as merely illustrative, rather than as restrictive, and all such modifications or changes, if any, are intended to fall within the scope of the present technology as described and set forth herein.

More specifically, while illustrative exemplary aspects of the technology have been described herein, the present technology is not limited to these aspects, but includes any and all aspects having modifications, omissions, combinations (e.g., of aspects across various aspects), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, the term "preferably" is non-exclusive where it is intended to mean "preferably, but not limited to." Any steps recited in any method or process claims may be executed in any order and are not limited to the order presented in the claims. Accordingly, the scope of the invention should be determined solely by the appended claims and their legal equivalents, rather than by the descriptions and examples given above.

The invention claimed is:

1. An outdoor lighting device, comprising:
   a vertical stand;
   a curved rigid housing disposed about a top of the stand coupled to a power source, wherein the curved housing comprises a curved planar surface having a radius of curvature;
   the curved housing comprising an outside side and an inner side, the inner side comprising a curved COB LED assembly having a radius of curvature that is substantially the same as the radius of curvature of the housing;
   a gear coupled to the stand and the curved housing configured to permit the curved housing to be rotated 360 degrees radially with respect to the stand and 90 degrees vertically with respect to the stand.

2. The outdoor lighting device of claim 1, wherein the lighting device comprises a single curved housing coupled to the gear about a center of the inner side of the curved housing.

3. The outdoor lighting device of claim 1, wherein the lighting device comprises a single curved housing coupled to the gear about an end of the inner side of the curved housing.

4. The outdoor lighting device of claim 1, wherein the lighting device comprises a first COB LED assembly disposed about an interior of the curved housing and a second COB LED assembly disposed about an edge of the curved housing.

5. The outdoor lighting device of claim 4, wherein the second COB LED assembly comprises an arc disposed about an edge of the curved housing, the arc comprising a radius of curvature substantially similar to the radius of curvature of the curved housing.

6. The outdoor lighting device of claim 4, wherein the second COB LED assembly is oriented about the curved housing such that a face of the second COB LED assembly is substantially perpendicular to a longitudinal length of the curved housing.

7. The outdoor lighting device of claim 4, wherein the second COB LED assembly is oriented about the curved housing such that a face of the second COB LED assembly is disposed at an angle that is not normal to a longitudinal length of the curved housing.

8. The outdoor lighting device of claim 1, wherein the light source comprises a plurality of COB LED assemblies.

9. The outdoor lighting device of claim 8, wherein a first of the plurality of COB LED assemblies disposed about a first interior end of the curved housing and a second of the plurality of COB LED assemblies is disposed about a second interior end of the curved housing.

10. The outdoor lighting device of claim 1, further comprising a plurality of curved housings.

11. The outdoor lighting device of claim 1, further comprising a solar panel coupled to the stand and electrically coupled to the COB LED assembly.

12. An outdoor lighting device, comprising:
   a vertical stand;
   a first and a second curved rigid housing disposed about a top of the stand, wherein the first and second curved housings comprise a curved planar surface, each having a similar radius of curvature;
   the curved housings comprising an outside side and an inner side, the inner side comprising a curved COB LED assembly having a radius of curvature that is substantially the same as the radius of curvature of the housings;
   a gear coupled to the stand and the curved housing configured to permit the curved housing to be rotated 360 degrees radially with respect to the stand and 90 degrees vertically with respect to the stand.

13. The outdoor lighting device of claim 12, wherein the first and second housings are coupled together by the gear and are independently moveable with respect to one another about a vertical axis with respect to the stand.

14. The outdoor lighting device of claim 13, wherein the first and second housings are jointly rotatable radially with respect to the stand.

15. The outdoor lighting device of claim 12, wherein each of the first and second housings comprises a first curved COB LED assembly and a second curved COB LED assembly.

16. The outdoor lighting device of claim 15, wherein the first curved COB LED assembly of each housing is disposed about an interior of each of the curved housings and the second curved COB LED assembly of each housing is disposed about an exterior edge of each of the curved housings.

* * * * *